Sept. 22, 1964 W. E. MARTIN 3,149,429
ROAD SCRAPER WITH EARTH MOVING DEVICE CONNECTED
THERETO BY ARTICULATE LINK MEANS
Filed Nov. 27, 1962
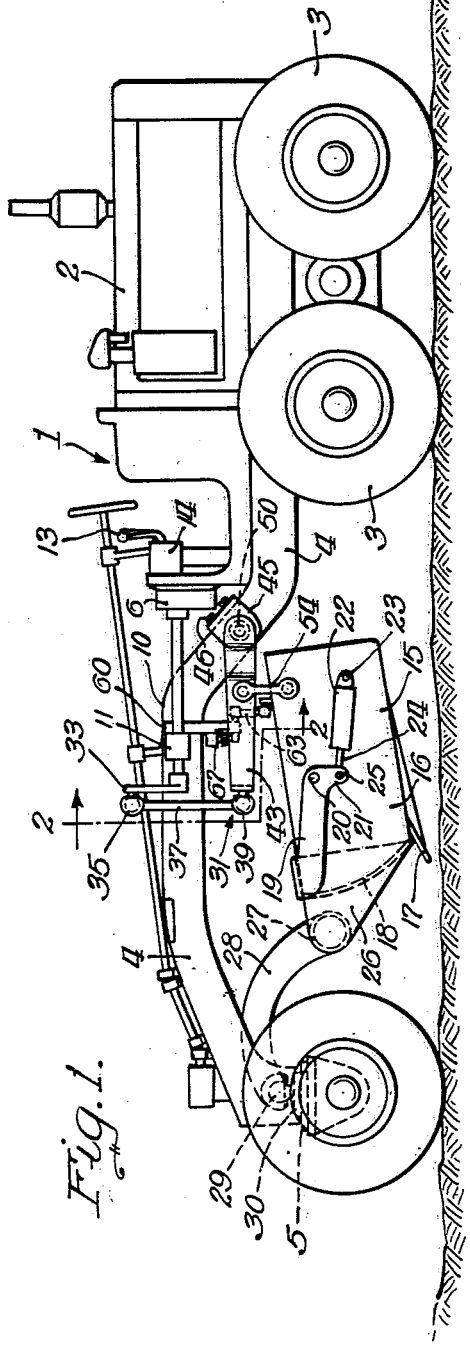
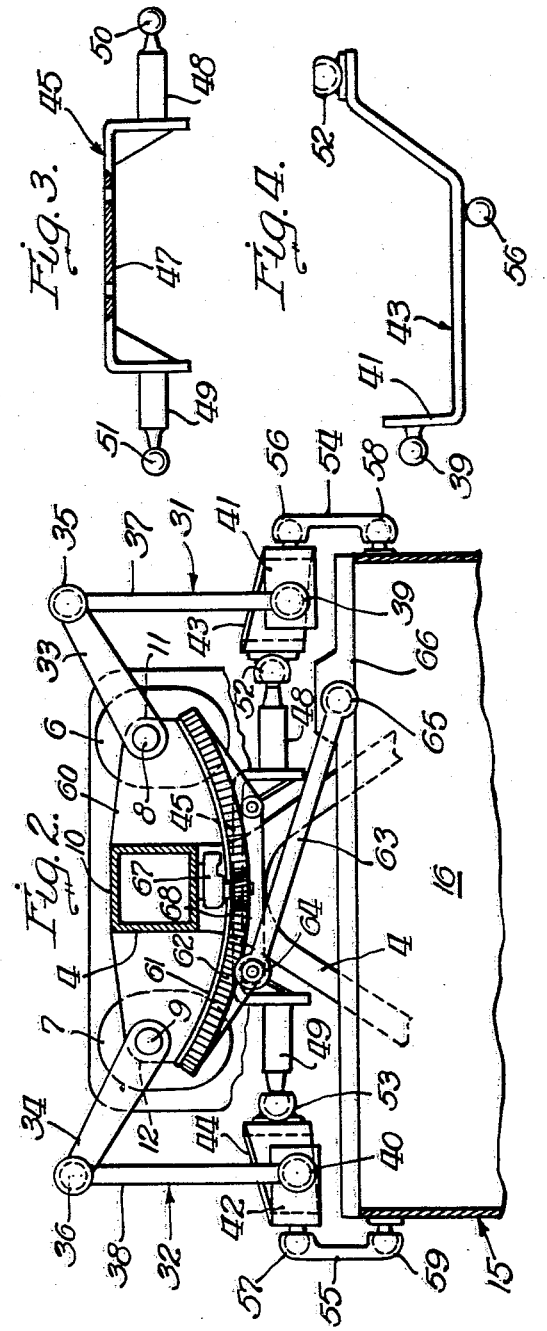
INVENTOR:
William E. Martin
BY
Eberhard E. Walley
Atty.

__3,149,429__
__ROAD SCRAPER WITH EARTH MOVING DEVICE CONNECTED THERETO BY ARTICULATE LINK MEANS__
William E. Martin, % Martin Co.,
P.O. Box 187, Kewanee, Ill.
Filed Nov. 27, 1962, Ser. No. 240,219
9 Claims. (Cl. 37—124)

This invention relates to a motor grader type of machine adapted to support a scraper of large load capacity subject to various manipulations as selectively oriented by an operator through a new and novel form of suspension system attached to the machine and connected with the power means thereof.

More specifically the invention is directed to a scraper attachable to a conventional power road grader as a substitute means in place of the scraper blade when removed, thus converting a road working machine or vehicle of the motor grader type into a convenient load carrying scraper which is adjustably suspended from the frame of this kind of a unit.

One of the objects of this invention is to provide a scraper with attachable facilities to connect the scraper unit to a conventional road working machine such as a road grader, such facilities including towing mechanism together with operable link structures operatively suspended from the grader frame and from the power mechanisms of the motor grader.

Another object is to support the scraper in multiple point relation with respect to the grader frame and grader power means for greater flexibility of operation of the scraper. The apparatus that carries the scraper comprises laterally spaced universal means to carry the scraper from the frame of the motor grader including laterally spaced universal means interposed between the power lift mechanisms of the motor grader and the scraper, in combination with a forwardly and longitudinally spaced towing mechanism universally connected with the motor grader frame and the scraper.

Another object is to provide suspension means to carry the scraper for universal movement from a frame of a ground working vehicle to permit universal orientation of the scraper with respect to the frame and with respect to a scraper towing means connection mounted on the frame of the vehicle, all with the addition of vertically and laterally independently operable power means on said vehicle connected with the scraper to develop the various orientation movements for the scraper to carry out its designed functions.

A still further object is to provide supporting link mechanisms including power means having advantageous load carrying or supporting means to further reduce the strain on the power means, the links and on the universal connections of the links.

Other objects and advantages shall hereinafter appear in or become evident from the following detailed description of the invention having reference to the accompanying drawing forming a part of this specification.

In the drawings:

FIG. 1 is a side elevational view of a vehicle or road working machine equipped with the new and novel scraper and the associated mechanisms that connect the scraper to a frame or rigid portion of the machine;

FIG. 2 is a vertical cross sectional view taken substantially along the general path of the line 2—2 illustrated in FIG. 1;

FIG. 3 is a side view of the saddle support for the machine or vehicle frame having means to carry the scraper link mechanisms from the frame; and FIG. 4 is a plan view of one of the links of the link system of the scraper comprising one of the principal orientation members to adjust the scraper in different selected positions in relation to the vehicle and to the ground.

In the drawing the scraper assembly is illustrated in combination with a vehicle of the motor grader type. Generally the motor grader comprises a vehicle 1, a power unit 2 on wheels 3, a frame 4 and a steering wheel unit 5. The motor grader vehicle 1 is equipped with the usual power drive means housed in gear casings 6 and 7, each drive means being connected by suitable transmission means to receive controlled power from the power unit 2 and each of the casings having shafts 8 and 9 extending forwardly flanking the overhead section 10 of frame 4, and supported in bearings such as 11 and 12. The drive to the shafts is controlled through suitable levers 13 on a control unit 14 coacting with the gears in casings 6 and 7.

The scraper 15 of the present arrangement provides a material handling bowl which is freely suspended under the frame section 10 and comprises briefly a forwardly open bowl 16 provided with a cutting blade 17 and an adjustable bowl closure hood 18 having side arms 19 each pivoted at 20 on bowl 16. The arms 19, one on each side of the bowl, have angularly offset wings 21 and hydraulic cylinders 22 are each pivoted as at 23 on the bowl 16 with their ram rods 24 connected with the respective arm wings at 25 to raise and lower hood 18 according to conditions of operation and as desired by an operator.

The forward wall extensions 26 on each bowl side wall carry a rigidly connected transverse tubular tow brace 27 for the scraper, the brace having a towing tongue 28 which is mounted for universal movement by ball and socket means 29 supported upon the frame 4 on a frame part 30 thereof. The described towing arrangement establishes a forward linking mechanism as a support means on the frame for towing the scraper 15 while allowing such a material handling unit freedom of motion to move up and down bodily or sideways laterally and to tilt or cant horizontally according to the adjustment of the scraper by the other supporting link system apparatus as will hereinafter be described.

Duplicate link systems such as 31 and 32 are each interposed between the scraper 15 at laterally spaced locations thereon and the frame and power means of the motor grader 1. As seen in the drawings, the link systems provide independently operable power means to adjustably regulate the position of the scraper in relation to the vehicle and in relation to the ground.

The link systems 31 and 32 each incorporate similar elements providing right hand and left hand facilities for supporting and lifting the scraper comprising swingable crank arms 33 and 34 secured to shafts 8 and 9 and having suitable universal unit connections at 35 and 36 with suspension links 37 and 38. The lower ends of links 37 and 38 are connected with suitable universal units 39 and 40 to the free ends 41 and 42 of swingable beams 43 and 44.

A saddle type bracket 45 best seen in FIG. 3 is provided to seat over the frame 4 for attachment to the frame by suitable fastenings such as 46 and comprises the saddle portion 47 carrying support shafts or studs 48 and 49 having universal ball ends 50 and 51 to receive the companion portions 52 and 53 on the frame end portions of the swingable beams 43 and 44, beam 43 being better illustrated in FIG. 4. The described arrangements for connecting the beams with the frame of the vehicle comprise operable means to aid in stabilizing the link systems during the operation thereof under the action of the power lift means hereinbefore described. This construction is well adapted to a scraper assembly having universal suspension characteristics as in the present invention.

Scraper carrier links 54 and 55 are each connected intermediate the lengths of beams 43 and 44 through ball and socket means 56 and 57 for universal motion. Each link 54 and 55 is joined for universal motion through the use of the ball and socket means 58 and 59 which are connected at opposite outward sides of the scraper bowl 16. Beams 43 and 44 provide orientation means on the frame 4 to help stabilize the actions of the scraper bolw 16 through the links 54 and 55 during the regulation and manipulation of the bowl by the link means and the power lift means.

Additional regulatory apparatus for the scraper is mounted on frame 4 comprising a transverse bracket 60 which supports the bearings 11 and 12 previously mentioned and whach bracket has a suitable arcuate track 61 to support an arcuate rack 62 for arcuate motion in relation to frame 4. An arm 63 is connected with rack 62 by ball and socket means 64 and the arm extends laterally of the vehicle for ball and socket connection at 65 with a suitable scraper part such as a cross brace 66 secured to the scraper 15. Transmission power unit 67 drives a pinion gear 68 to actuate the rack in either direction to shift the arm 63 for bodily moving the scraper into different selected lateral positions beneath the frame 4 and about the pivot point of the socket means 29.

To manipulate the scraper 15, an operator with the use of the levers 13 and control unit 14 may energize one or both shafts 8 and 9, individually or together and in the same or opposite directions to raise, lower or tilt the scraper in a predetermined manner. Bodily lateral motion is imparted to the scraper by the rack and pinion apparatus 62–68 to further augment the link system manipulation of the scraper through such compounded action.

By locating the carrier links 54 and 55 for suspension from points such as 56 and 57 on beams 43 and 44, the mechanical advantage thus obtained will reduce the maximum stresses to which the duplicate link systems are subjected during the various manipulations of the scraper.

The foregoing description is directed to one exemplary embodiment of the invention. Certain changes in the individual elements or in the specific combinations thereof are contemplated without departure from the fundamental concept of the invention. The extent of the modifications shall, however, be governed by the breadth and scope of the language in the appended claimed subject matter as directed to the invention herein disclosed.

What I claim is:

1. A road working vehicle provided with a scraper assembly comprising, in combination, a rigid structural member on said vehicle, power lift means on the vehicle, a scraper provided with towing tongue means connected with the vehicle, and cooperative independent link mechanisms to operatively suspend said scraper from said rigid structural member with at least one of said link structures comprising a support beam including a carrier link suspended from an intermediate portion of said support beam and being connected with said scraper, said beam being mounted on said member for movement relatively to said rigid structural member and having attached suspension means thereon connected with said power lift means for the power manipulation of said scraper in relation to the rigid structural member of the vehicle and into selected operative positions in relation to the ground through said link structures.

2. A road working vehicle provided with a scraper assembly comprising, in combination, a rigid structural member on said vehicle, power lift means on the vehicle, a scraper, and spaced independent cooperative link mechanisms connected with opposite sides of said scraper to operatively suspend said scraper from said rigid structural member with at least two of said link mechanisms each comprising a support beam including a carrier link connected with said scraper, said beam and having one end thereof mounted on said member for movement relatively to said rigid structural member and having suspension means on the other end thereof connected with said power lift means for the power manipulation of said scraper in relation to the rigid structural member of the vehicle and into selected operative positions in relation to the ground, said cooperative link mechanisms providing another link mechanism comprising a towing assembly for the scraper having connection with the scraper and being provided with a universal connection attachment structure to establish a universal towing connection with said rigid structural member of said vehicle.

3. A road working vehicle provided with a scraper assembly comprising, in combination, a rigid structural member on said vehicle, power lift means on the vehicle, a scraper independently supported with respect to said structural member, and cooperative link mechanisms to operatively suspend said scraper from said rigid structural member to swing freely with respect to said rigid structural member with at least one of said link structures comprising a support beam including a carrier link connected with said scraper, said beam being mounted on said rigid structural member for movement relatively to said rigid structural member and having suspension means connected with said power lift means for the power manipulation of said freely swinging scraper in relation to the rigid structural member of the vehicle and for manipulation into selected operative positions in relation to the ground, the point of location of the connection of said suspension means of said beam with said power lift means and the point of location of the support beam mounting on the structural member occupying fore and aft positions along the line of travel of the vehicle, and said carrier link being connected with the beam intermediate the aforesaid two mentioned points.

4. A road working vehicle provided with a scraper assembly comprising, in combination, a rigid structural member on said vehicle, power lift means on the vehicle, a scraper, and cooperative link mechanisms to operatively suspend said scraper from said rigid structural member with one of said link structures comprising a rigid towing tongue on said scraper having a universal mounting for connecting with said rigid structural member on said vehicle, said other link mechanisms each comprising a support beam including a carrier link connected with said scraper, said beam being mounted on said member for movement relatively to said rigid structural member and having suspension means connected with said power lift means for the power manipulation of said scraper in relation to the rigid structural member of the vehicle and into selected operative positions in relation to the ground, said other cooperative link mechanisms each including universal unit connections between the respective elements thereof and at the junctions of said mechanisms with the structural member and with said power lift means.

5. A scraper for a road working vehicle comprising, in combination, a vehicle frame, a material carrying scraper bowl freely positioned underneath said frame, a tow member connected with said bowl to support one portion of the bowl and having a universal connection with said frame to tow said bowl, power lift means on said frame and supporting link systems to suspend another portion of the scraper bowl from the frame, said link systems each comprising articulate link elements connected with said power lift means and with said scraper bowl, and a mounting apparatus to support said link elements from said frame comprising a saddle type bracket releasably secured to the frame and providing attachment means thereon for the operative reception of said link elements in a given relation with respect to said frame.

6. A road working vehicle having a material handling scraper releasably attached thereto comprising, in combination, a frame on said vehicle, power lift means carried by said frame, a material carrying scraper, tow means for said scraper universally connected with said vehicle frame, and link means to support said scraper, one link means being joined with one power lift means and another link means being joined with another power lift means, each of said link means having at least one link member thereof connected with the frame of the vehicle to stabilize said scraper while under operation of said lift means, said one link member of each of said link means being connected with said frame through a detachable means comprising an attachment bracket with universal means thereon releasably secured to said frame to provide spaced universal arrangements on said frame for the reception of each one of said link members of the respective link means.

7. A road working vehicle having a material handling scraper releasably attached thereto comprising, in combination, a frame on said vehicle, power lift means carried by said frame, a material carrying scraper, tow means for said scraper universally connected with said frame, and link means to support said scraper, one link means being joined with one power lift means and another link means being joined with another power lift means, each of said link means having at least one link member thereof connected with the frame of the vehicle to stabilize said scraper while under operation of said power lift means, said one link member of each of said link means being connected with the frame through a detachable means comprising an attachment bracket releasably secured to said frame to provide spaced universal arrangements thereon for each one of said link members of the respective link means, each of said one link members including a carrier link connected intermediate the length of the respective one link member to depend therefrom for operative connection with said scraper.

8. A scraper attachment for a road working vehicle providing a replacement mechanism to take the place of the usual scraper blade assembly of said vehicle with the vehicle including a frame and dual separately operable lift means on said frame, comprising a material carrying scraper bowl having a forwardly open end to accept and to discharge a load of material, towing means on said scraper bowl adjacent the open end thereof and for universal connection with said frame, and laterally spaced link systems to connect with said lift means respectively and connected at laterally spaced locations at the rear portion of said bowl, said link systems each including at least one link member for a pivotal connection with said frame at a point remote from the point of connection of said link system with said lift means, said one link member including a universal means disposed intermediate the length of said one link member to support a carrier link that connects with said scraper bowl, and additional laterally shiftable mechanism to connect with the frame and having pivotal connection with the scraper bowl to actuate the bowl laterally with respect to the frame to supplement the vertical actuation of said bowl by said lift means and the connected link systems.

9. A scraper assembly adapted for operative connection with the frame of a road working vehicle having power lift crank members mounted on the frame, comprising a scraper bowl, tow means for said scraper bowl having universal means to connect with said frame, and link means to support said scraper bowl, one of said link means being provided to connect with one power lift crank member and another of said link means being provided to connect with another power lift crank member, each of said link means having at least one link element thereof provided with pivotal means to connect with the frame of the vehicle to stabilize said scraper bowl while under the operation of the power lift crank members.

References Cited in the file of this patent
UNITED STATES PATENTS

| | | |
|---|---|---|
| 2,074,565 | Shaeffer | May 23, 1937 |
| 2,258,038 | Titus | Oct. 7, 1941 |
| 2,292,241 | Reeves | Aug. 4, 1942 |
| 2,348,910 | Kadz | May 16, 1944 |
| 2,488,016 | Lado | Nov. 15, 1949 |
| 2,515,429 | Smoot | July 18, 1950 |
| 2,788,138 | Stueland | Apr. 9, 1957 |
| 2,862,315 | Blanchet | Dec. 2, 1958 |
| 2,961,783 | Bowen | Nov. 29, 1960 |